United States Patent
Farris

(10) Patent No.: US 9,755,946 B2
(45) Date of Patent: Sep. 5, 2017

(54) CONFIDENTIALLY DETERMINING ROUTE DIVERSITY FOR NETWORK ROUTES

(71) Applicant: Verizon Patent and Licensing Inc., Arlington, VA (US)

(72) Inventor: Jack M. Farris, Mendham, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 285 days.

(21) Appl. No.: 14/590,217

(22) Filed: Jan. 6, 2015

(65) Prior Publication Data
US 2016/0197815 A1 Jul. 7, 2016

(51) Int. Cl.
H04L 12/28 (2006.01)
H04L 12/751 (2013.01)

(52) U.S. Cl.
CPC .................... H04L 45/02 (2013.01)

(58) Field of Classification Search
CPC ........................................................ H04L 45/02
See application file for complete search history.

(56) References Cited

U.S. PATENT DOCUMENTS

| | | | |
|---|---|---|---|
| 7,751,392 B1 * | 7/2010 | Gonzalez | H04L 12/2602 370/389 |
| 2002/0165957 A1 * | 11/2002 | Devoe | H04L 12/2697 709/224 |
| 2003/0118036 A1 * | 6/2003 | Gibson | H04L 45/02 370/401 |
| 2006/0098587 A1 * | 5/2006 | Vasseur | H04L 45/04 370/254 |
| 2006/0233181 A1 * | 10/2006 | Raszuk | H04L 45/02 370/401 |
| 2007/0053300 A1 * | 3/2007 | Zhu | H04L 45/12 370/238 |
| 2008/0075016 A1 * | 3/2008 | Ashwood-Smith | H04L 45/02 370/252 |
| 2008/0123651 A1 * | 5/2008 | Vasseur | H04L 12/4633 370/392 |
| 2009/0016331 A1 * | 1/2009 | Shah | H04L 45/128 370/356 |
| 2009/0034418 A1 * | 2/2009 | Flammer, III | H04W 40/248 370/238 |
| 2009/0097416 A1 * | 4/2009 | Gruber | H04L 45/00 370/254 |

(Continued)

Primary Examiner — Gregory Sefcheck
Assistant Examiner — Jael Ulysse

(57) ABSTRACT

A device receives, from a customer device, a request for a diversity determination associated with a first route provided in a first provider network and a second route provided in a second provider network. The request includes a first identifier associated with the first route and a second identifier associated with the second route. The device forwards the first identifier to a first provider device, and receives, based on the first identifier, first geospatial information associated with the first route. The device forwards the second identifier to a second provider device associated, and receives, based on the second identifier, second geospatial information associated with the second route. The device determines whether the first and second routes are diverse based on the first geospatial information and the second geospatial information, and provides, to the customer device, diversity information regarding whether the first and second routes are diverse.

20 Claims, 13 Drawing Sheets

(56) References Cited

U.S. PATENT DOCUMENTS

| | | | |
|---|---|---|---|
| 2009/0109854 A1* | 4/2009 | Rajpathak | H04L 29/12066 370/238 |
| 2009/0182894 A1* | 7/2009 | Vasseur | H04L 45/02 709/239 |
| 2009/0182896 A1* | 7/2009 | Patterson | H04L 45/02 709/241 |
| 2010/0014519 A1* | 1/2010 | Fernandez Gutierrez | H04L 12/185 370/390 |
| 2010/0150029 A1* | 6/2010 | Hasegawa | H04L 12/44 370/256 |
| 2011/0080911 A1* | 4/2011 | Guichard | H04L 45/02 370/392 |
| 2011/0153549 A1* | 6/2011 | Cherng | H04L 41/0873 707/603 |
| 2012/0093154 A1* | 4/2012 | Rosenberg | H04L 45/04 370/392 |
| 2012/0093166 A1* | 4/2012 | Rosenberg | H04L 45/02 370/401 |
| 2013/0176845 A1* | 7/2013 | Olofsson | H04L 45/22 370/225 |
| 2014/0369229 A1* | 12/2014 | Martineau | H04L 45/02 370/254 |
| 2015/0036684 A1* | 2/2015 | Modi | H04L 45/22 370/389 |
| 2015/0092594 A1* | 4/2015 | Zhang | H04L 45/12 370/254 |
| 2015/0264135 A1* | 9/2015 | Kandula | H04L 67/1095 709/204 |
| 2015/0304159 A1* | 10/2015 | Sharma | H04L 41/0663 370/248 |
| 2015/0381486 A1* | 12/2015 | Xiao | H04L 45/70 370/237 |
| 2016/0191370 A1* | 6/2016 | Wood | H04L 45/02 370/238 |

* cited by examiner

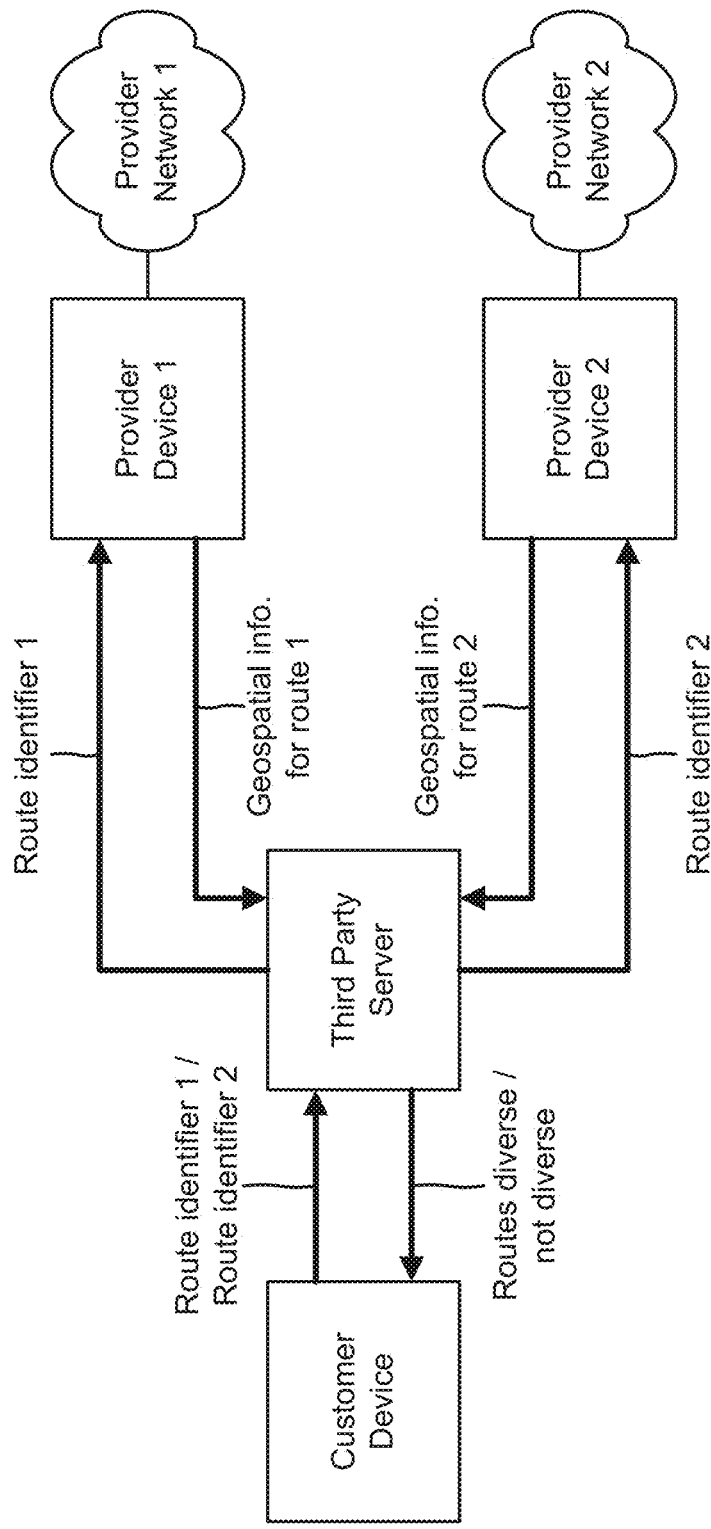

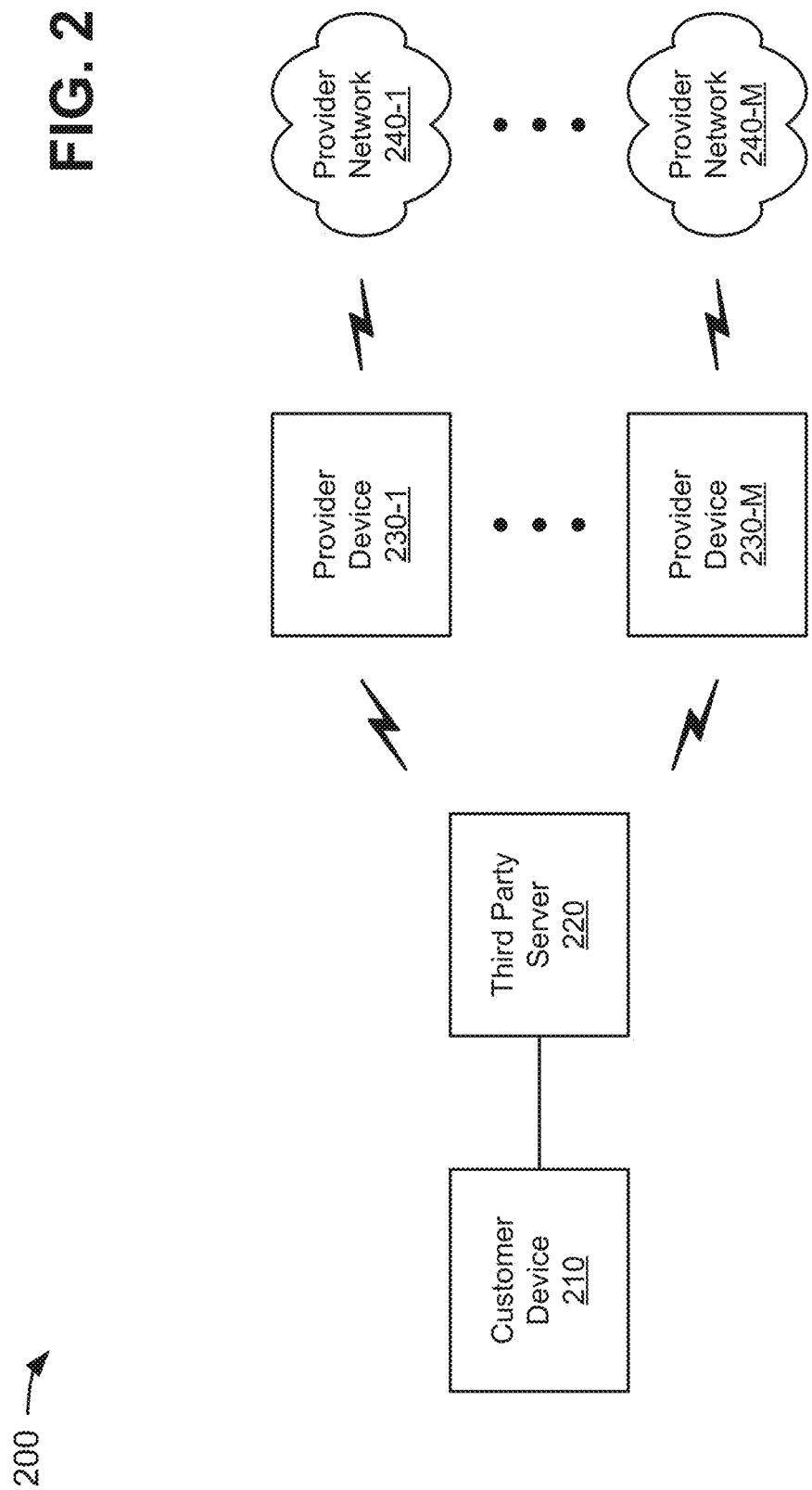

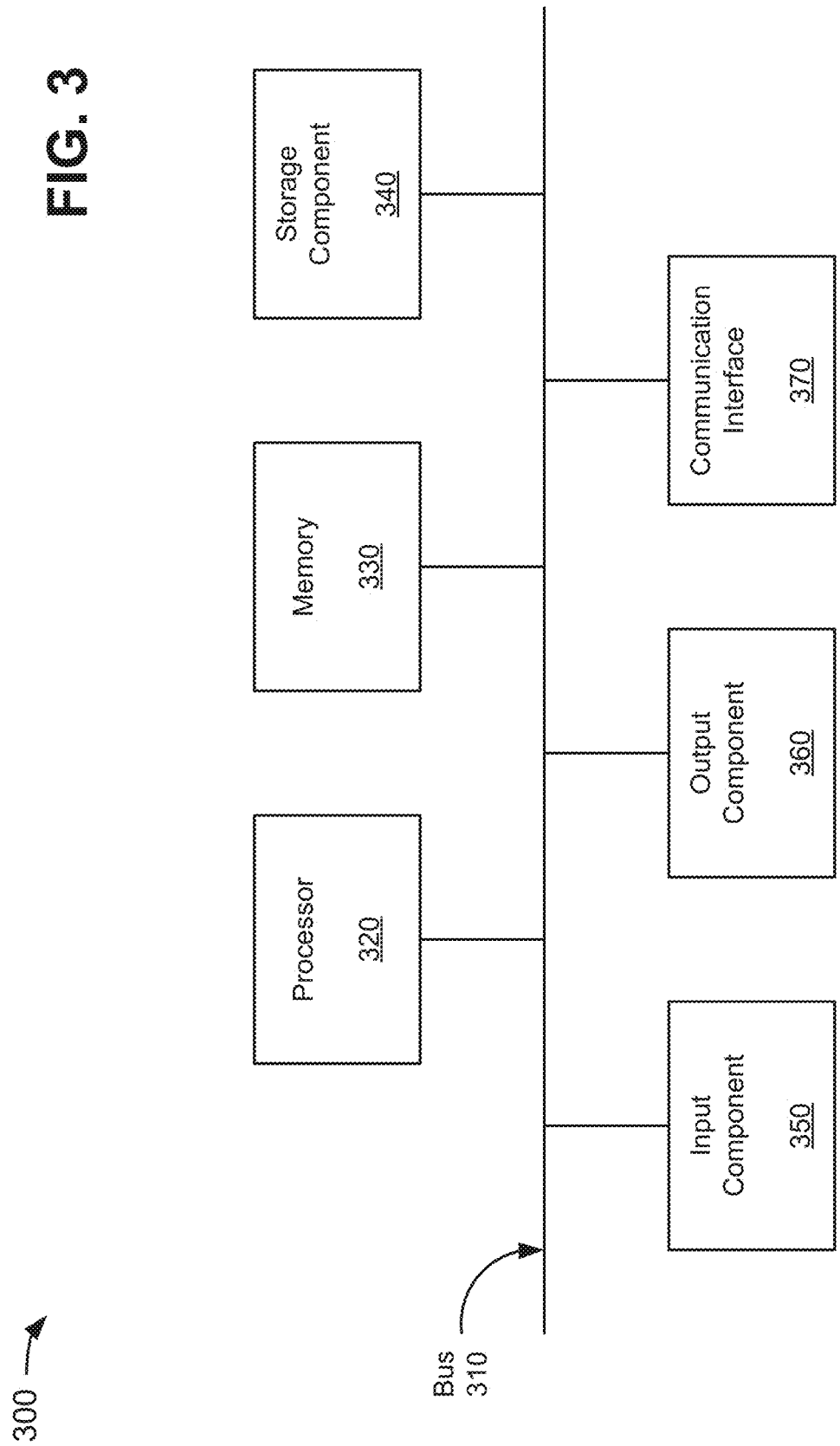

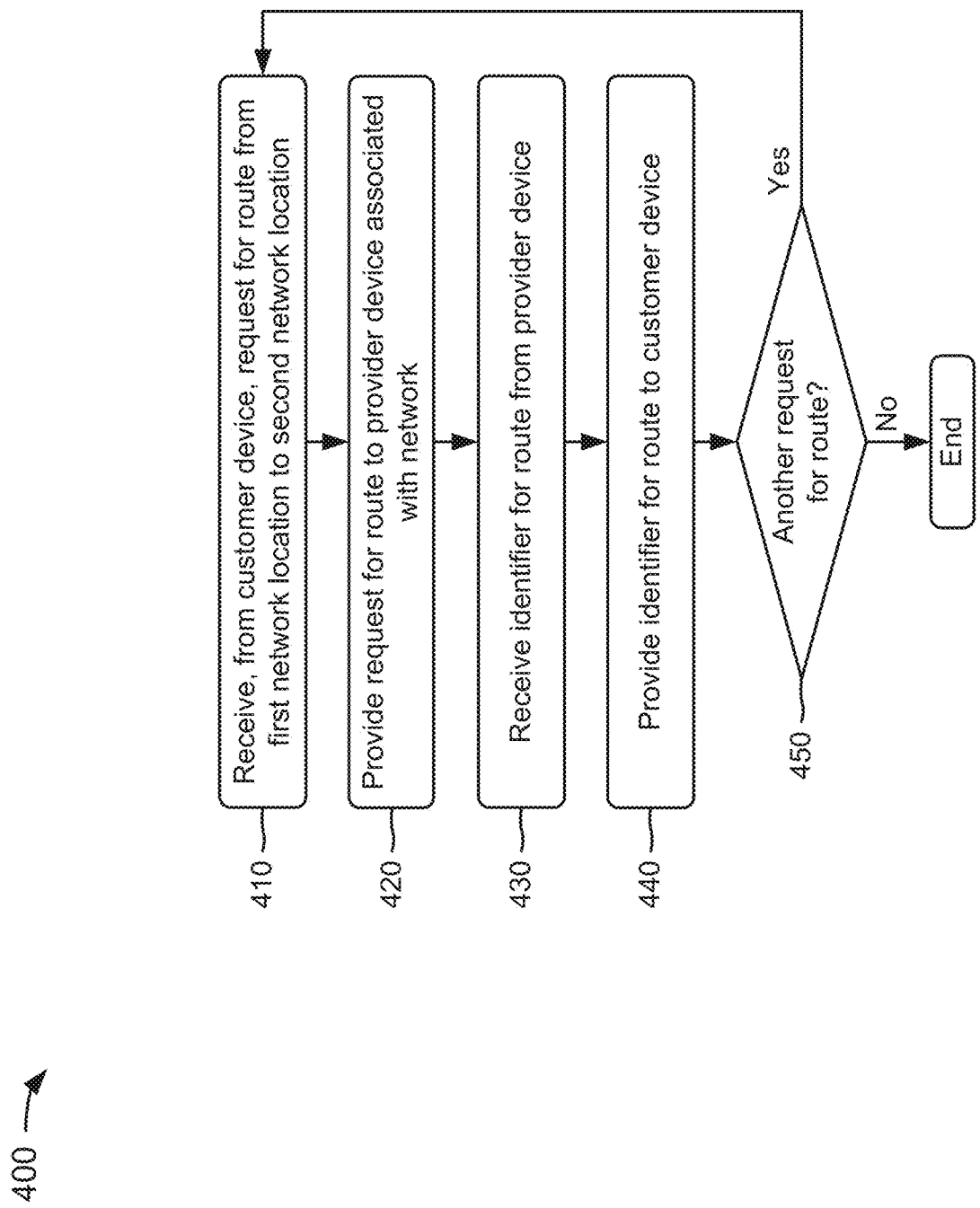

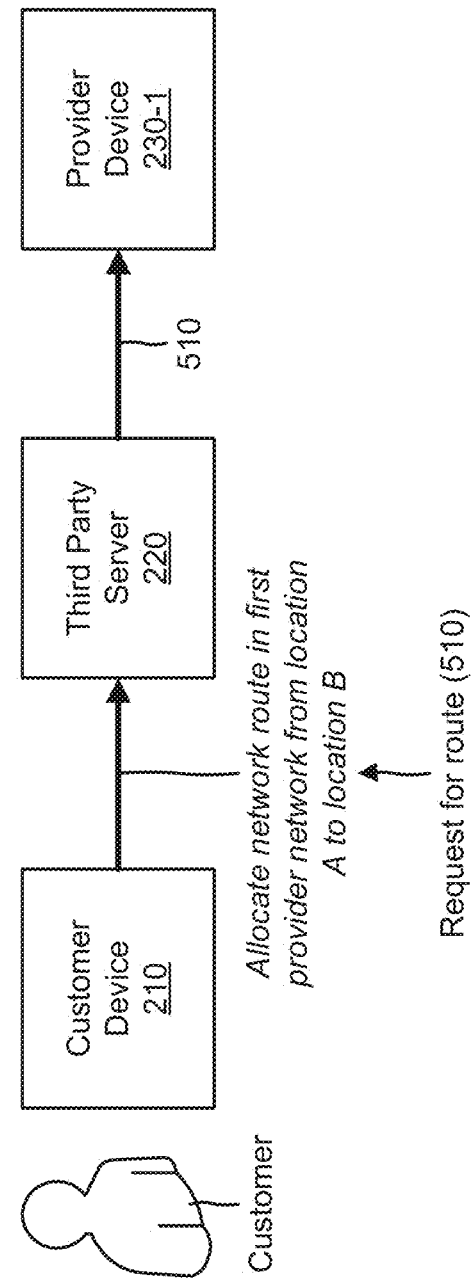

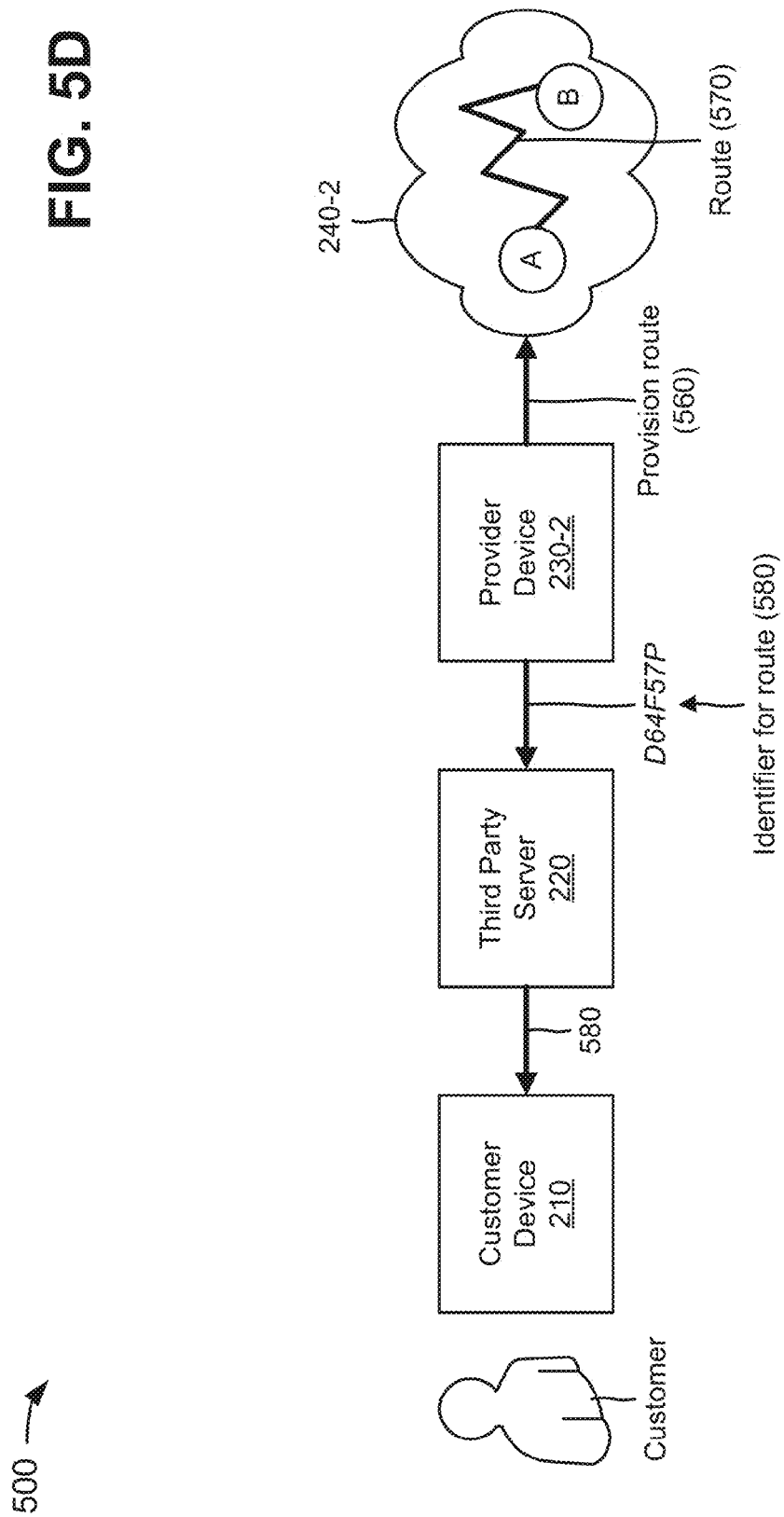

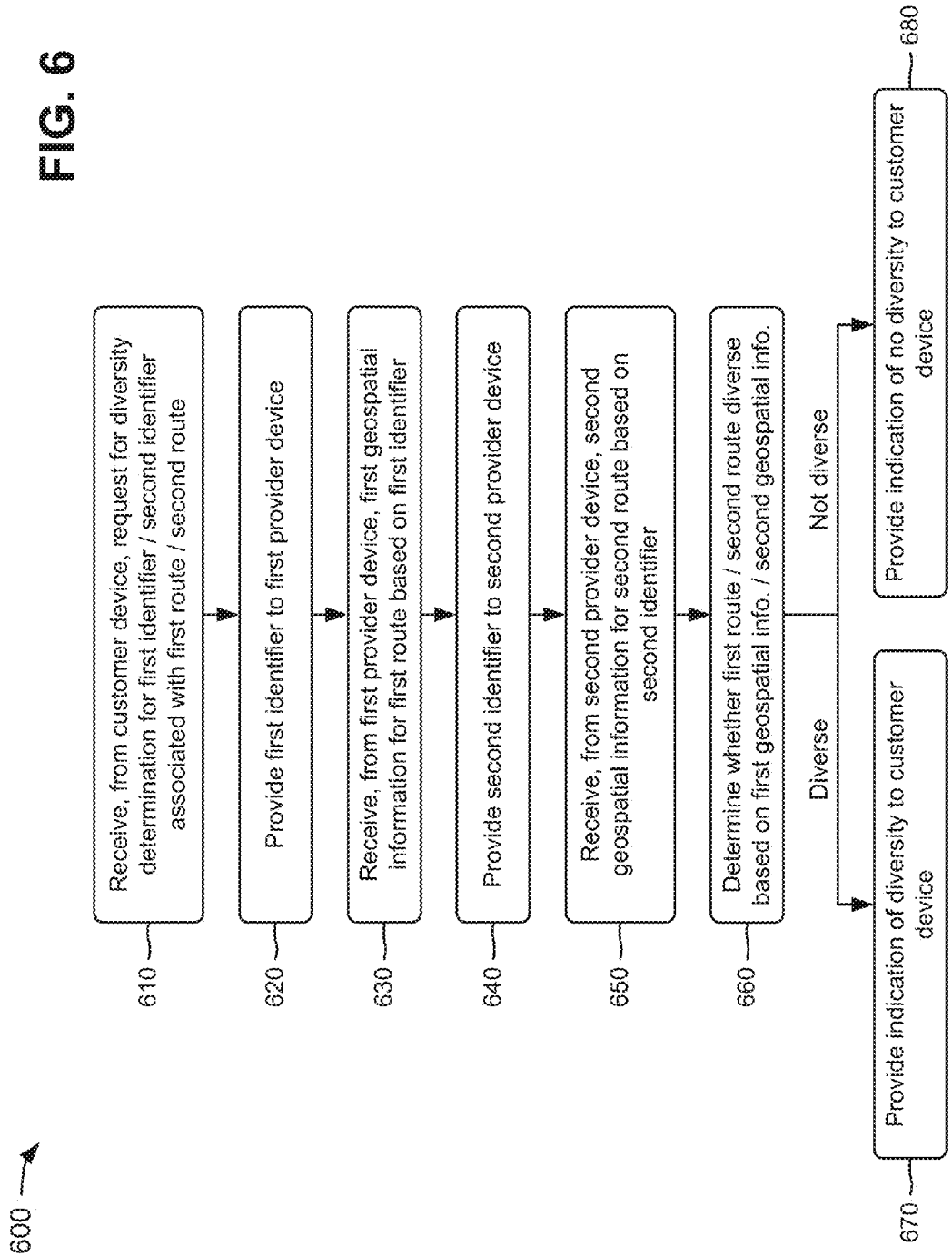

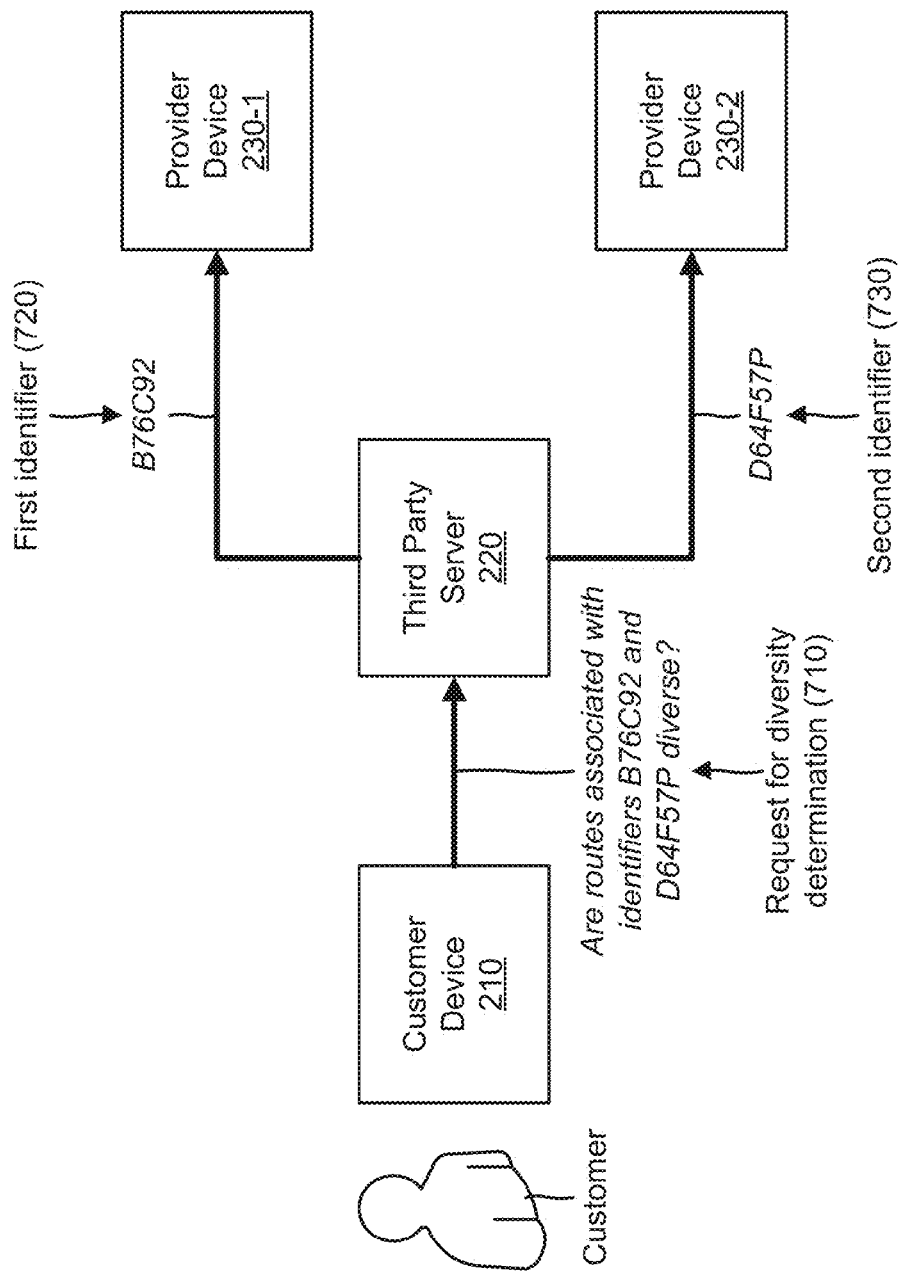

CONFIDENTIALLY DETERMINING ROUTE DIVERSITY FOR NETWORK ROUTES

BACKGROUND

Service providers, such as telecommunication service providers, Internet service providers, or the like, allocate routes or paths through the service providers' networks for customers, such as financial institutions, corporations, or the like. Many customers utilize network routes provided by different service providers, and request detailed maps of the network routes provided by the different service providers. Typically, customers request specific route information for the network routes in order to ensure route diversity across the multiple service provider networks. For example, banks are required to demonstrate route diversity to government regulators in order to operate. A network may be geographically or route diverse if, for any two points on the network, there are at least two routes between the points that never intersect or overlap geographically. Route diversity may protect a customer from outages caused by incidents, such as malicious acts, explosions, a car hitting a utility pole, a backhoe digging up buried fiber, or the like.

BRIEF DESCRIPTION OF THE DRAWINGS

FIG. 1 is a diagram of an overview of an example implementation described herein;

FIG. 2 is a diagram of an example environment in which systems and/or methods, described herein, may be implemented;

FIG. 3 is a diagram of example components of one or more devices of FIG. 2;

FIG. 4 is a flow chart of an example process for creating identifiers for network routes in order to preserve confidentiality of the network routes;

FIGS. 5A-5D are diagrams of an example implementation relating to the example process shown in FIG. 4;

FIG. 6 is a flow chart of an example process for confidentially determining route diversity for network routes; and FIGS. 7A-7D are diagrams of an example implementation relating to the example process shown in FIG. 6.

DETAILED DESCRIPTION OF PREFERRED EMBODIMENTS

Figure 5B:
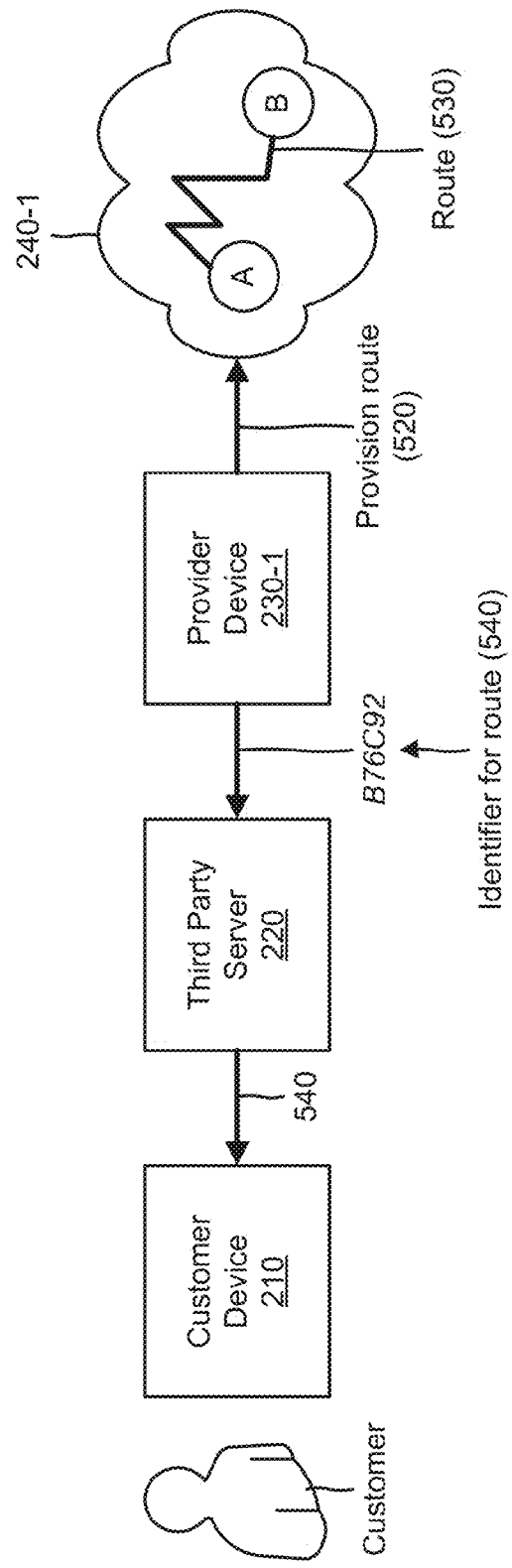

The following detailed description of example implementations refers to the accompanying drawings. The same reference numbers in different drawings may identify the same or similar elements.

Several service providers attempt to protect the confidentiality of and prevent access to maps of the network routes for security reasons (e.g., to protect against malicious acts, such as terrorist attacks, cyber attacks, or the like) and/or competitive reasons (e.g., to prevent other service providers from gaining access to such information). For example, if a malicious party (e.g., a terrorist, a terminated employee, or the like) gains access to a network route map, the malicious party may utilize the map to destroy a portion(s) of a network and create a network outage for an extended period of time. However, the customers may demand that the service providers allow permanent retention of the network route maps for due diligence purposes, for legal purposes, and/or for use in managing diversity between suppliers. Accordingly, service providers have, from time to time, provided network route maps to customers.

However, the information on a fixed network route map may become stale over time and may only be accurate on the day the map is issued since networks are constantly changing. Thus, when a customer makes a route diversity assessment based on network route maps, the customer is likely using route information that is stale. For example, if a customer wants to demonstrate (e.g., to regulators) that route diversity exists six months after purchasing network routes, the customer will be relying on outdated network route maps that the regulators may not deem acceptable. Furthermore, information about network routes and/or route diversity, associated with particular service providers, may be helpful to unscrupulous entities (e.g., individuals, groups, and/or countries) interested in damaging or destroying critical network infrastructure. Once the network route maps become accessible to the customers, it may be very difficult to ensure that the maps remain protected against inappropriate disclosure to such entities.

FIG. 1 is a diagram of an overview of an example implementation 100 described herein. As shown, a customer device may be associated with a third party server, a first provider device (Provider Device 1), a second provider device (Provider Device 2), a first provider network (Provider Network 1), and a second provider network (Provider Network 2). The customer device may be associated with a customer that purchases network routes through the first provider network and the second provider network. Assume that the customer purchases a first route through the first provider network, and that the first provider device provisions the first route through the first provider network. Further, assume that the customer purchases a second route through the second provider network, and that the second provider device provisions the second route through the second provider network.

At any given time, the customer may wish to determine whether the first route and the second route are diverse (e.g., include route diversity). Accordingly, the customer may instruct the customer device to provide, to the third party server, a request for a diversity analysis for the first route and the second route. As further shown in FIG. 1, the customer device may provide (e.g., with the request) route identifiers to the third party server, such as a first route identifier and a second route identifier. The route identifiers may include a secure mechanism to identify network routes, without disclosing route information to the customer. For example, each of the route identifiers may include a bar code, a quick response (QR) code, a word, a numeric code, an alphabetical code, an alphanumeric code, or the like, that is associated with a route provisioned through the provider networks.

As further shown in FIG. 1, the third party server may determine that the first route identifier is associated with the first provider network, and may provide the first route identifier to the first provider device. The first provider device may identify geospatial information (e.g., a network route map) for the first route based on the first route identifier, and may provide the geospatial information for the first route to the third party server. The third party server may determine that the second route identifier is associated with the second provider network, and may provide the second route identifier to the second provider device. The second provider device may identify geospatial information (e.g., a network route map) for the second route based on the second route identifier, and may provide the geospatial information for the second route to the third party server. The third party server may determine whether the first route and the second route are diverse based on the geospatial information for the first route and the geospatial information for the second route. The third party server may provide, to the customer device, an indication of whether the first route and the second route are diverse.

Systems and/or methods described herein may enable a customer to receive a route diversity determination for network routes without divulging route information (e.g., network route maps), associated with the network routes, to the customer. The systems and/or methods may provide the route diversity determination in response to a request from the customer, which may keep disclosure of the route diversity determination to a minimum and may prevent inappropriate access to the route diversity determination. The systems and/or methods may prevent inappropriate access to the route information, and may ensure that up-to-date (i.e., not stale) route information is utilized for the route diversity determination.

As used herein, the term customer is intended to be broadly interpreted to include a customer device, or a user of a customer device. The term entity, as used herein, is intended to be broadly interpreted to include a business, an organization, a government agency, a provider device, a user of a provider device, or the like.

FIG. 2 is a diagram of an example environment 200 in which systems and/or methods, described herein, may be implemented. As shown in FIG. 2, environment 200 may include a customer device 210, a third party server 220, provider devices 230-1 through 230-M (collectively referred to herein as provider devices 230, and, in some instances, singularly as provider device 230) (M≥1), and provider networks 240-1 through 240-M (collectively referred to herein as provider networks 240, and, in some instances, singularly as provider network 240). Devices and/or networks of environment 200 may interconnect via wired connections, wireless connections, or a combination of wired and wireless connections.

Customer device 210 may include a device capable of receiving, generating, storing, processing, and/or providing information in a manner described herein. For example, customer device 210 may include a communications and/or computing device, such as a mobile phone (e.g., a smart phone, a radiotelephone, etc.), a laptop computer, a tablet computer, a handheld computer, a desktop computer, a workstation computer, or a similar device. In some implementations, customer device 210 may receive information from and/or transmit information to another device in environment 200. In some implementations, customer device 210 may be associated with a customer that utilizes network resources (e.g., network routes) of provider networks 240.

Third party server 220 may include one or more personal computers, one or more workstation computers, one or more server devices, one or more virtual machines (VMs) provided in a cloud computing environment, or one or more other types of computation and communication devices. In some implementations, third party server 220 may receive, from customer device 210, a request for a route through provider network 240, and may provide the request to provider device 230. Third party server 220 may receive an identifier for the route from provider device 230, and may provide the identifier to customer device 210. In some implementations, third party server 220 may receive a request for a route diversity determination associated with network routes (e.g., through provider networks 240), and may provide the route diversity determination to customer device 210 without divulging route information associated with the network routes. In some implementations, third party server 220 may be unaffiliated with provider networks 240. In some implementations, third party server 220 may be affiliated with a provider network 240.

Provider device 230 may include one or more personal computers, one or more workstation computers, one or more server devices, one or more VMs provided in a cloud computing environment, one or more network devices (e.g., routers, gateways, or the like), or one or more other types of computation and communication devices. In some implementations, provider device 230 may provision a route, requested by a customer, through provider network 240, and may assign an identifier to the route. Provider device 230 may provide the identifier to the customer, via customer device 210 and/or third party server 220. In some implementations, provider device 230 may be associated with an entity that manages and/or operates provider network 240, such as, for example, a telecommunication service provider, a television service provider, an Internet service provider, or the like.

Provider network 240 may include one or more wired and/or wireless networks. For example, provider network 240 may include a cellular network (e.g., a long term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or another type of network.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

FIG. 3 is a diagram of example components of a device 300. Device 300 may correspond to customer device 210, third party server 220, and/or provider device 230. In some implementations, customer device 210, third party server 220, and/or provider device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for creating identifiers for network routes in order to preserve confidentiality of the network routes. In some implementations, one or more process blocks of FIG. 4 may be performed by third party server 220. Additionally, or alternatively, one or more process blocks of FIG. 4 may be performed by another device or a group of devices separate from or including third party server 220, such as provider device 230.

As shown in FIG. 4, process 400 may include receiving, from a customer device, a request for a route from a first network location to a second network location (block 410). For example, a customer associated with customer device 210 may wish to purchase a route from a service provider associated with provider network 240-1. Accordingly, the customer may cause customer device 210 to generate a request for a route through provider network 240-1. In some implementations, the request may identify provider device 230-1 and/or provider network 240-1. In some implementations, the route may include a route from a first location of provider network 240-1 to a second location of provider network 240-1. In some implementations, customer device 210 may provide the request for the route to third party server 220, and third party server 220 may receive the request. In some implementations, customer device 210 may provide the request for the route directly to provider device 230-1, without providing the request to third party server 220. In some implementations, customer device 210 may provide the request for the route to third party server 220 and provider device 230-1.

As further shown in FIG. 4, process 400 may include providing the request for the route to a provider device associated with a network (block 420). For example, third party server 220 may provide the request for the route to provider device 230-1 associated with provider network 240-1. In some implementations, if customer device 210 provides the request to provider device 230-1, third party server 220 need not provide the request to provider device 230-1.

As further shown in FIG. 4, process 400 may include receiving an identifier for the route from the provider device (block 430). For example, provider device 230-1 may instruct network devices (e.g., routers, gateways, base stations, firewalls, or the like) of provider network 240-1 to provision a route from the first location of provider network 240-1 to the second location of provider network 240-1. In some implementations, the route may start at a first network device at the first location, traverse via one or more other network devices of provider network 240-1, and arrive at a second network device at the second location.

In some implementations, provider device 230-1 may allocate an identifier to information associated with the route, such as geospatial information. The geospatial information may include information that identifies geographic locations and characteristics of the route (e.g., provisioned in provider network 240-1) on the Earth, and may be represented by points, lines, polygons, and/or other geographic features. In some implementations, the geospatial information may include a network route map that includes geographical coordinates associated with the route provisioned in provider network 240-1. For example, the geospatial information may indicate that the first location is located at a first latitude and longitude (e.g., 40° North latitude and 75° West longitude); that the route traverses a first path to a second latitude and longitude (e.g., 40° North latitude and 77° West longitude); that the route traverses other paths at other latitudes and longitudes; and that the route arrives at the second location at a third latitude and longitude (e.g., 42° North latitude and 85° West longitude).

In some implementations, the identifier may include a secure mechanism to identify the route provisioned in provider network 240-1, without disclosing route information to the customer. For example, the identifier may include a bar code, a quick response (QR) code, a word, a numeric code, an alphabetical code, an alphanumeric code, or the like, that is associated with the route provisioned in provider network 240-1. In some implementations, provider device 230-1 may provide the identifier to third party server 220, and third party server 220 may receive the identifier. In some implementations, provider device 230-1 may provide the identifier to customer device 210 and third party server 220. In some implementations, third party server 220 may store the identifier in a data structure (e.g., a database, a table, a list, a tree, or the like) that includes a field listing identifiers received from provider devices 230, a field identifying provider devices 230 associated with the identifiers, and/or one or more other fields (e.g., a field identifying address information associated with provider devices 230).

As further shown in FIG. 4, process 400 may include providing the identifier for the route to the customer device (block 440). For example, third party server 220 may provide the identifier to customer device 210. In some implementations, provider device 230-1 may provide the identifier to customer device 210. In some implementations, customer device 210 may store the identifier in a data structure that includes a field listing identifiers received from provider devices 230, a field identifying service providers associated with routes purchased by the customer, a field describing the routes purchased by the customer, and/or one or more other fields.

As further shown in FIG. 4, process 400 may include determining whether there is another request for a route (block 450). For example, the customer may wish to purchase another route through provider network 240-1 or through another provider network (e.g., provider network 240-2). In some implementations, the customer may instruct customer device 210 to generate another request for a route through provider network 240-1 or another provider network, and to provide the request to third party server 220. In some implementations, other customers may wish to purchase routes through provider networks 240, and may instruct customer devices 210 to generate requests for the routes and to provide the requests to third party server 220. In some implementations, third party server 220 may determine whether any additional requests for routes are received from customer devices 210 based on whether requests are received from customer devices 210.

In some implementations, the requests for routes may be provided directly to provider devices 230, without being provided to third party server 220. In such implementations, third party server 220 may receive identifiers for the routes from provider devices 230, after the routes are provisioned in provider networks 240.

As further shown in FIG. 4, if there is another request for a route (block 450—YES), process 400 may include returning to block 410. If there is not another request for a route (block 450—NO), process 400 may end. For example, if customer device 210 generates another request for a route, third party server 220 may receive the request and may perform the additional blocks of process 400, as described above. In some implementations, if third party server 220 does not receive other requests for routes, but the other requests are provided to provider devices 230, third party server 220 may receive identifiers for the routes from provider devices 230, after the routes are provisioned in provider networks 240.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5D are diagrams of an example implementation 500 relating to example process 400 shown in FIG. 4. FIGS. 5A-5D show an example of creating identifiers for network routes in order to preserve confidentiality of the network routes.

As shown in FIG. 5A, assume that a customer, associated with customer device 210, wishes to purchase a route through a network associated with provider device 230-1. Further, assume that the customer causes customer device 210 to generate a request 510 for a route, and to provide request 510 to third party server 220. Request 510 may include information requesting that the route be provided through the network associated with provider device 230-1. For example, request 510 may include information requesting provider device 230-1 to provision the route through provider network 240-1 from location A to location B. As further shown in FIG. 5A, third party server 220 may receive request 510, and may provide request 510 to provider device 230-1.

As shown in FIG. 5B, based on request 510, provider device 230-1 may provision 520 a route 530 through provider network 240-1 from location A to location B. In some implementations, provider device 230-1 may allocate one or more network devices and/or links between the network devices, in provider network 240-1, to communications associated with the customer. For example, if the customer is a bank, provider device 230-1 may allocate routers, gateways, fiber optic cables, or the like, in provider network 240-1, to financial transactions associated with the bank. As further shown in FIG. 5B, provider device 230-1 may create an identifier 540 (e.g., "B76C92") for geospatial information associated with route 530, and may provide identifier 540 to third party server 220. Third party server 220 may receive and store identifier 540, and may provide identifier 540 to customer device 210. Customer device 210 may store identifier 540 and/or may display identifier 540 to the customer.

Figure 5C:
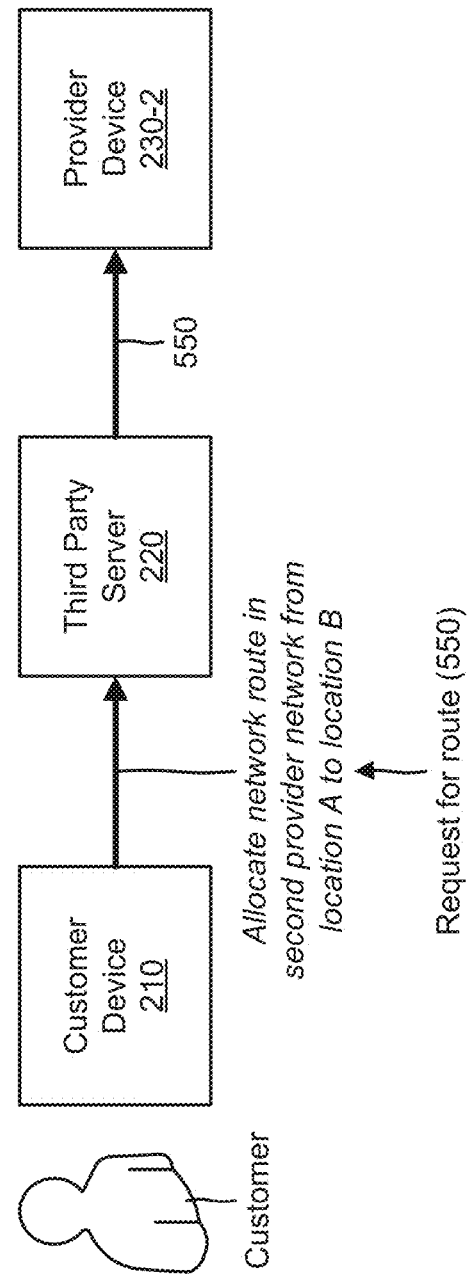

As shown in FIG. 5C, now assume that the customer wishes to purchase another route through a network associated with provider device 230-2. Further, assume that the customer causes customer device 210 to generate a request 550 for a route, and to provide request 550 to third party server 220. Request 550 may include information requesting that the route be provided through the network associated with provider device 230-2. For example, request 550 may include information requesting provider device 230-2 to provision the route through provider network 240-2 from location A to location B. As further shown in FIG. 5C, third party server 220 may receive request 550, and may provide request 550 to provider device 230-2.

As shown in FIG. 5D, based on request 550, provider device 230-2 may provision 560 a route 570 through provider network 240-2 from location A to location B. In some implementations, provider device 230-2 may allocate one or more network devices and/or links between the network devices, in provider network 240-2, to communications associated with the customer. For example, if the customer is the bank, provider device 230-2 may allocate servers, firewalls, fiber optic cables, or the like, in provider network 240-2, to financial transactions associated with the bank. As further shown in FIG. 5D, provider device 230-2 may create an identifier 580 (e.g., "D64F57P") for geospatial information associated with route 570, and may provide identifier 580 to third party server 220. Third party server 220 may receive and store identifier 580, and may provide identifier 580 to customer device 210. Customer device 210 may store identifier 580 and/or may display identifier 580 to the customer. Since route 530 and route 570 are both provided from location A to location B, the customer may desire to confirm that route 530 and route 570 are diverse. Enabling the customer to confirm route diversity is described below in connection with FIGS. 6-7D.

As indicated above, FIGS. 5A-5D are provided merely as an example. Other examples are possible and may differ from what was described with regard to FIGS. 5A-5D.

FIG. 6 is a flow chart of an example process 600 for confidentially determining route diversity for network routes. In some implementations, one or more process blocks of FIG. 6 may be performed by third party server 220. In some implementations, one or more process blocks of FIG. 6 may be performed by another device or a group of devices separate from or including third party server 220, such as provider device 230.

As shown in FIG. 6, process 600 may include receiving, from a customer device, a request for a diversity determination for a first identifier and a second identifier associated with a first route and a second route (block 610). For example, a customer associated with customer device 210 may wish to perform a diversity determination for two or more routes allocated to the customer by one or more service providers. In some implementations, the customer may wish to perform the route diversity determination for regulatory purposes and/or to ensure that the customer is protected from outages caused by incidents, such as malicious acts, explosions, or the like.

In some implementations, the customer may cause customer device 210 to generate a request for a diversity determination associated with a first route through provider network 240-1 and a second route through provider network 240-2. The request may include information indicating that the customer requests performance of a diversity determination for the first route and the second route, a first identifier for the first route, and a second identifier for the second route. In some implementations, customer device 210 may previously store the first identifier and the second identifier, but may not have access to geospatial information (e.g., network route maps) associated with the first route and the second route. In some implementations, customer device 210 may provide the request for the diversity determination to third party server 220, and third party server 220 may receive the request.

As further shown in FIG. 6, process 600 may include providing the first identifier to a first provider device (block 620). For example, third party server 220 may provide the first identifier for the first route to provider device 230-1. In some implementations, third party server 220 may compare the first identifier with information in a data structure (e.g., described above in connection with FIG. 4) that includes a field listing identifiers received from provider devices 230 and a field identifying provider devices 230 associated with the identifiers. Based on the comparison, third party server 220 may identify provider device 230-1 as being associated with the first identifier, and may utilize address information (e.g., a media access control (MAC) address, an Internet protocol (IP) address, or the like) provided in the data structure to forward the first identifier to provider device 230-1.

As further shown in FIG. 6, process 600 may include receiving, from the first provider device, first geospatial information for the first route based on the first identifier (block 630). For example, provider device 230-1 may receive the first identifier, and may retrieve (e.g., from memory) information, such as first geospatial information, associated with the first route, based on the first identifier. The first geospatial information may include information that identifies geographic locations and characteristics of the first route provisioned in provider network 240-1. In some implementations, provider device 230-1 may store (e.g., in a data structure) identifiers and geospatial information associated with the identifiers for all routes provisioned by provider device 230-1 in provider network 240-1. In such implementations, provider device 230-1 may compare the first identifier with information in the data structure, and based on the comparison, may identify the first geospatial information for the first route. In some implementations, provider device 230-1 may provide the first geospatial information for the first route to third party server 220, and third party server 220 may receive the first geospatial information. In some implementations, the geospatial information may not be static and may change over time since the service provider may move fiber optic cables, network devices, or the like associated with a route; may alter the route; may alter or replace network devices associated with the route; or the like. In some implementations, provider device 230 may store the most recent geospatial information.

As further shown in FIG. 6, process 600 may include providing the second identifier to a second provider device (block 640). For example, third party server 220 may provide the second identifier for the second route to provider device 230-2. In some implementations, third party server 220 may compare the second identifier with information in a data structure (e.g., described above in connection with FIG. 4) that includes a field listing identifiers received from provider devices 230 and a field identifying provider devices 230 associated with the identifiers. Based on the comparison, third party server 220 may identify provider device 230-2 as being associated with the second identifier, and may utilize address information (e.g., a MAC address, an IP address, or the like) provided in the data structure to forward the second identifier to provider device 230-2.

As further shown in FIG. 6, process 600 may include receiving, from the second provider device, second geospatial information for the second route based on the second identifier (block 650). For example, provider device 230-2 may receive the second identifier, and may retrieve (e.g., from memory) information, such as second geospatial information, associated with the second route, based on the second identifier. The second geospatial information may include information that identifies geographic locations and characteristics of the second route provisioned in provider network 240-2. In some implementations, provider device 230-2 may store (e.g., in a data structure) identifiers and geospatial information associated with the identifiers for all routes provisioned by provider device 230-2 in provider network 240-2. In such implementations, provider device 230-2 may compare the second identifier with information in the data structure, and based on the comparison, may identify the second geospatial information for the second route. In some implementations, provider device 230-2 may provide the second geospatial information for the second route to third party server 220, and third party server 220 may receive the second geospatial information.

As further shown in FIG. 6, process 600 may include determining whether the first route and the second route are diverse based on the first geospatial information and the second geospatial information (block 660). For example, third party server 220 may determine whether the first route and the second route are diverse based on the first geospatial information and the second geospatial information. In some implementations, third party server 220 may determine that the first route and the second route are diverse if the first route and the second route extend between two physical locations and never intersect or overlap geographically. In some implementations, third party server 220 may determine that the first route and the second route are not diverse if the first route and the second route extend between the two physical locations and intersect or overlap at least once geographically.

In some implementations, third party server 220 may certify the diversity determination for a particular time period. For example, assume that third party server 220 receives the first geospatial information and the second geospatial information at 1:00 PM on Jul. 3, 2014, and performs the diversity determination at or around the same time. In such an example, third party server 220 may certify the correctness of the diversity determination for a particular time period (e.g., in minutes, hours, days, or the like) after 1:00 PM on Jul. 3, 2014.

In some implementations, third party server 220 may receive a distance threshold (e.g., in meters, kilometers, or the like) from customer device 210 (e.g., provided by the customer), and may determine whether the first route and the second route are diverse based on the distance threshold. For example, assume that the customer specifies "500" meters as the distance threshold for the diversity determination. In such an example, third party server 220 may determine that the first route and the second route are diverse if the first route and the second route extend between two physical locations and the first route is always more than "500" meters from the second route.

In some implementations, third party server 220 may determine a minimum tolerance of diversity (e.g., in meters, kilometers, or the like) for the first route and the second route. For example, assume that third party server 220 determines that the first route and the second route are diverse, and that the first route is closest (e.g., within "10" meters) to the second route at a particular location. In such an example, third party server 220 may determine that the minimum tolerance of diversity for the first route and the second route is "10" meters.

In some implementations, third party server 220 may determine a percentage of route diversity for the first route and the second route. For example, assume that third party server 220 determines that the first route and the second route intersect or overlap at ten points geographically, and that there are one-hundred points associated with the first route and the second route. In such an example, third party server 220 may determine that the first route and the second route are 90% diverse. In another example, assume that third party server 220 determines that the first route is less than "200" meters from the second route at twenty points geographically. In such an example, third party server 220 may determine that the first route and the second route are 80% diverse within "200" meters.

As further shown in FIG. 6, if the first route and the second route are diverse (block 660—Diverse), process 600 may include providing an indication of diversity to the customer device (block 670). For example, if third party server 220 determines that the first route and the second route are diverse, third party server 220 may provide, to customer device 210, an indication that the first route and the second route are diverse. In some implementations, third party server 220 may determine that the first route and the second route are diverse if the first route and the second route never intersect or overlap geographically, if the first route is always more than a distance threshold from the second route, or the like. In some implementations, the indication may include a user interface that provides information indicating that the first route and the second route are diverse. For example, the indication may include an approval code indicating that the first route and the second route are diverse, information indicating that the first route and the second route are 100% diverse, or the like. In some implementations, customer device 210 may display the indication to the customer, and/or may store the indication.

As further shown in FIG. 6, if the first route and the second route are not diverse (block 660—Not Diverse), process 600 may include providing an indication of no diversity to the customer device (block 680). For example, if third party server 220 determines that the first route and the second route are not diverse, third party server 220 may provide, to customer device 210, an indication that the first route and the second route are not diverse. In some implementations, third party server 220 may determine that the first route and the second route are not diverse if the first route and the second route intersect or overlap at least once geographically, if the first route is less than a distance threshold from the second route at least once, or the like. In some implementations, the indication may include a user interface that provides information indicating that the first route and the second route are not diverse. For example, the indication may include a disapproval code indicating that the first route and the second route are not diverse, information indicating that the first route and the second route are less than 100% diverse, or the like. In some implementations, customer device 210 may display the indication to the customer, and/or may store the indication.

In some implementations, third party server 220 may calculate a diversity score for two or more routes based on geospatial information associated with the routes. In some implementations, third party server 220 may assign weights (e.g., values, percentages, etc.) to different geospatial information associated with the different routes. In some implementations, third party server 220 may calculate the diversity score for the routes based on the geospatial information and the assigned weights. In some implementations, third party server 220 may compare the diversity score to a threshold to determine whether the routes are diverse. For example, if the diversity score is greater than a high threshold, third party server 220 may determine that the routes are diverse. If the diversity score is less than a low threshold, third party server 220 may determine that the routes are not diverse. In some implementations, third party server 220 may provide the diversity score, the comparison result for the diversity score, and/or the diversity determination to customer device 210.

In some implementations, all communications among customer device 210, third party server 220, and provider devices 230, described herein, may be provided in a secure manner through use of cryptographic protocols (e.g., a secure sockets layer (SSL) protocol, a transport layer security (TLS) protocol, or the like), encryption, authentication, or the like. In some implementations, the customer may be required to treat the route identifiers as highly proprietary information. In some implementations, third party server 220 may utilize malware, antivirus, and/or other types of applications to protect against malicious activity, such as sniffing, phishing, hacking, or the like. In some implementations, third party server 220 may perform health checks to ensure that third party server 220 is operating properly and protected against malicious activity. In some implementations, third party server 220 may delete the geospatial information associated with routes once a diversity determination is made for the routes and provided to customer device 210.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7B:
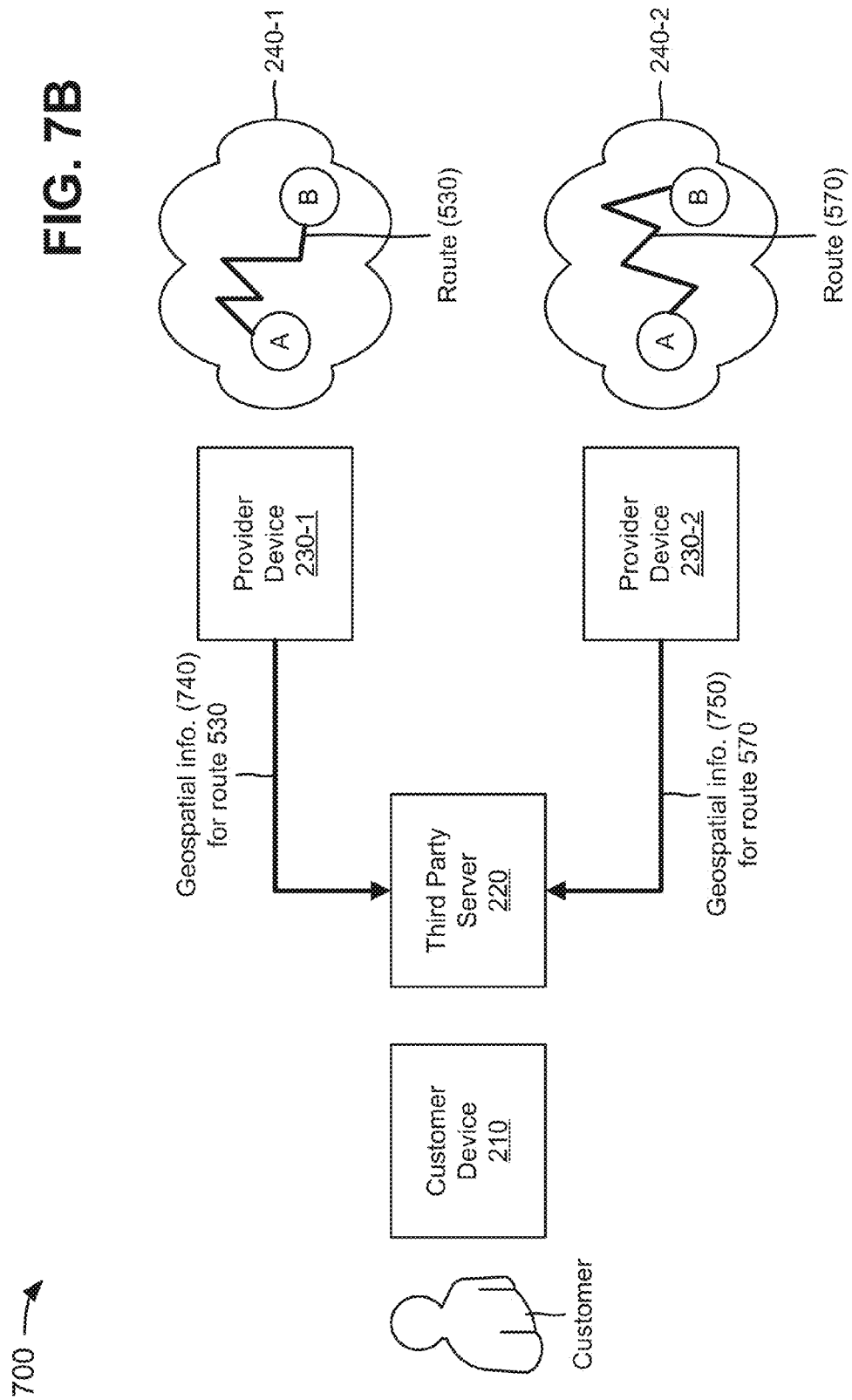

FIGS. 7A-7D are diagrams of an example implementation 700 relating to example process 600 shown in FIG. 6. FIGS. 7A-7D show an example of confidentially determining route diversity for network routes. As shown in FIG. 7A, assume that a customer, associated with customer device 210, wishes to perform a diversity determination for a first route allocated to the customer by a first service provider associated with provider device 230-1 and a second route allocated to the customer by a second service provider associated with provider device 230-2. The customer may cause customer device 210 to generate a request 710 for performance of the diversity determination for the first route and the second route. Request 710 may include a first identifier 720 (e.g., "B76C92") for the first route, a second identifier 730 (e.g., "D64F57P") for the second route, and information requesting that the diversity determination be performed based on first identifier 720 and second identifier 730.

As further shown in FIG. 7A, customer device 210 may provide request 710 to third party server 220. Third party server 220 may compare first identifier 720 with information in a data structure that includes a field listing identifiers received from provider devices 230 and a field identifying provider devices 230 associated with the identifiers. Based on the comparison, third party server 220 may identify provider device 230-1 as being associated with first identifier 720, and may forward first identifier 720 to provider device 230-1. Third party server 220 may compare second identifier 730 with information in the data structure, and based on the comparison, may identify provider device 230-2 as being associated with second identifier 730. Third party server 220 may forward second identifier 730 to provider device 230-2.

With reference to FIG. 7B, provider device 230-1 may compare first identifier 720 with information in a data structure that includes a field listing identifiers for all routes provisioned by provider device 230-1 in provider network 240-1 and a field including geospatial information associated with the identifiers. Based on the comparison, provider device 230-1 may determine that route 530 of provider network 240-1 is associated with first identifier 720, and may retrieve geospatial information 740 for route 530. Geospatial information 740 may include information that identifies geographic locations and characteristics of route 530 (e.g., geographical coordinates of route 530 between location A and location B and network devices included along route 530). Provider device 230-1 may provide geospatial information 740 to third party server 220.

With further reference to FIG. 7B, provider device 230-2 may compare second identifier 730 with information in a data structure that includes a field listing identifiers for all routes provisioned by provider device 230-2 in provider network 240-2 and a field including geospatial information associated with the identifiers. Based on the comparison, provider device 230-2 may determine that route 570 of provider network 240-2 is associated with second identifier 730, and may retrieve geospatial information 750 for route 570. Geospatial information 750 may include information that identifies geographic locations and characteristics of route 570 (e.g., geographical coordinates of route 570 between location A and location B and network devices included along route 530). Provider device 230-2 may provide geospatial information 750 to third party server 220.

Figure 7C:
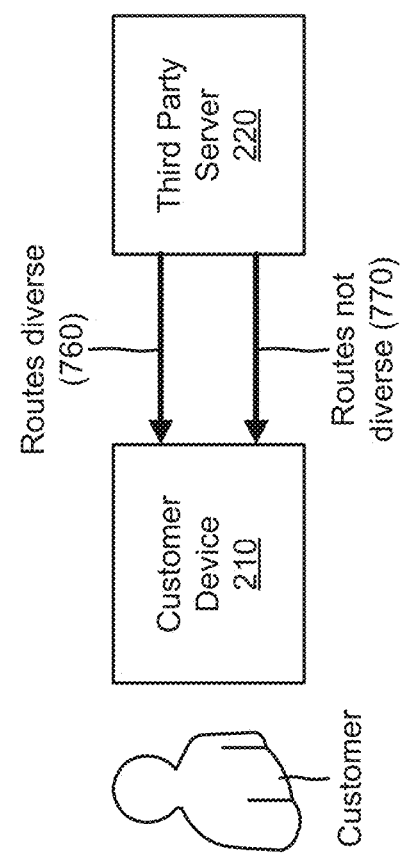

With reference to FIG. 7C, third party server 220 may determine whether route 530 and route 570 are diverse based on geospatial information 740 and geospatial information 750. Third party server 220 may determine that route 530 and route 570 are diverse if route 530 and route 570 never intersect or overlap between location A and location B. If third party server 220 determines that route 530 and route 570 are diverse, third party server 220 may provide, to customer device 210, an indication 760 that route 530 and route 570 are diverse. Alternatively, third party server 220 may determine that route 530 and route 570 are not diverse if route 530 and route 570 intersect or overlap at least once between location A and location B. If third party server 220 determines that route 530 and route 570 are not diverse, third party server 220 may provide, to customer device 210, an indication 770 that route 530 and route 570 are not diverse.

Figure 7D:
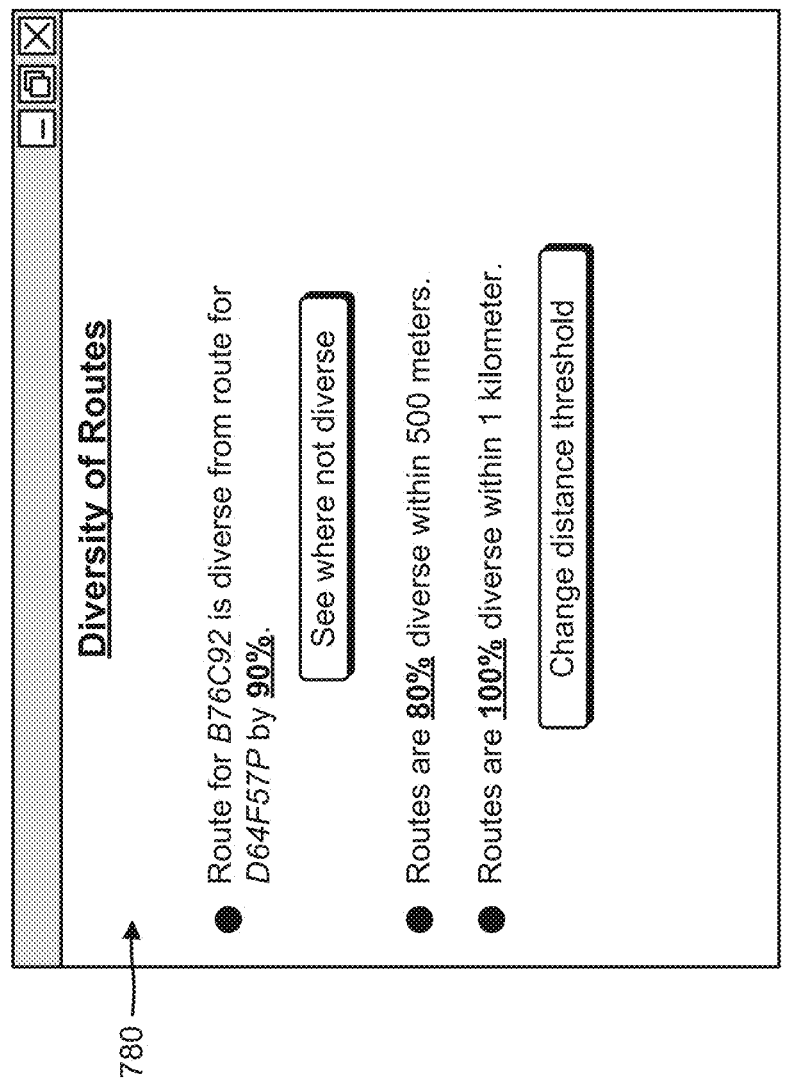

As shown in FIG. 7D, customer device 210 may provide indication 760 or indication 770 for display via a user interface 780. For example, user interface 780 may indicate that route 530, associated with first identifier 720 (e.g., "B76C92"), and route 570, associated with second identifier 730 (e.g., "D64F57P"), are 90% diverse. As further shown, user interface 780 may indicate that route 530 and route 570 are 80% diverse within a distance threshold of "500" meters, and 100% diverse within a distance threshold of "1" kilometer. User interface 780 may enable the customer to view locations where route 530 and route 570 are not diverse when the customer selects a first button (e.g., "See where not diverse"). User interface 780 may also enable the customer to change the distance threshold (e.g., from "500" meters or "1" kilometer) when the customer selects a second button (e.g., "Change distance threshold").

As indicated above, FIGS. 7A-7D are provided merely as an example. Other examples are possible and may differ from what was described with regard to FIGS. 7A-7D.

Systems and/or methods described herein may enable a customer to receive a route diversity determination for network routes without divulging route information, associated with the network routes, to the customer. The systems and/or methods may prevent inappropriate access to the route diversity determination. The systems and/or methods may prevent inappropriate access to the route information, and may ensure that up-to-date route information is utilized for the route diversity determination.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a textbased user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device and from a customer device, a request for a diversity determination associated with a first route provided in a first provider network and a second route provided in a second provider network,
   the request including a first identifier and a second identifier,
      the first identifier including a first secure mechanism to identify the first route, without disclosing information associated with the first route to the customer device, and
      the second identifier including a second secure mechanism to identify the second route, without disclosing information associated with the second route to the customer device;
   comparing, by the device, the first identifier with data in a data structure that includes identifiers and information identifying provider devices associated with the identifiers;
   identifying by the device, a first provider device, associated with the first provider network, based on comparing the first identifier with the data in the data structure;
   providing, by the device, the first identifier to the first provider device based on identifying the first provider device;
   receiving, by the device and based on the first identifier, first geospatial information associated with the first route,
   the first geospatial information being received from the first provider device;
   providing, by the device, the second identifier to a second provider device associated with the second provider network;
   receiving, by the device and based on the second identifier, second geospatial information associated with the second route,
   the second geospatial information being received from the second provider device;
   determining, by the device, whether the first route and the second route are diverse based on the first geospatial information and the second geospatial information; and
   providing, by the device and to the customer device, diversity information regarding whether the first route and the second route are diverse.

2. The method of claim 1, further comprising:
   deleting the first geospatial information and the second geospatial information after providing the diversity information to the customer device.

3. The method of claim 1, further comprising:
   comparing the second identifier with the data in the data structure;
   identifying the second provider device based on comparing the second identifier with the data in the data structure; and
   where providing the second identifier to the second provider device comprises:
   providing the second identifier to the second provider device based on identifying the second provider device.

4. The method of claim 1, where determining whether the first route and the second route are diverse comprises:
   determining that the first route and the second route are diverse when the first route and the second route never intersect or overlap geographically; and
   determining that the first route and the second route are not diverse when the first route and the second route intersect or overlap at least once geographically.

5. The method of claim 1, where:
   the first geospatial information includes information that identifies geographic locations and characteristics of the first route; and the second geospatial information includes information that identifies geographic locations and characteristics of the second route.

6. The method of claim 1, where the diversity information comprises at least one of:
a code indicating that the first route and the second route are diverse,
a code indicating that the first route and the second route are not diverse, or
information indicating whether the first route and the second route are diverse within a distance threshold.

7. The method of claim 1, further comprising:
assigning weights to the first geospatial information and the second geospatial information; and
calculating a diversity score, for the first route and the second route, based on the assigned weights, the first geospatial information, and the second geospatial information.

8. A device, comprising:
a memory; and
one or more processors, coupled to the memory, to:
receive, from a customer device, a request for a diversity determination associated with a first route provided in a first provider network and a second route provided in a second provider network,
the first provider network being different than the second provider network, and
the request including a first identifier and a second identifier,
the first identifier including a first secure mechanism to identify the first route, without disclosing information associated with the first route to the customer device, and
the second identifier including a second secure mechanism to identify the second route, without disclosing information associated with the second route to the customer device;
compare the first identifier with data in a data structure that includes identifiers and information identifying provider devices associated with the identifiers;
identify a first provider device, associated with the first provider network, based on comparing the first identifier with the data in the data structure;
provide the first identifier to the first provider device based on identifying the first provider device;
receive, from the first provider device and based on the first identifier, first geospatial information associated with the first route;
provide the second identifier to a second provider device associated with the second provider network;
receive, from the second provider device and based on the second identifier, second geospatial information associated with the second route;
determine whether the first route and the second route are diverse based on the first geospatial information and the second geospatial information; and
provide, to the customer device, diversity information regarding whether the first route and the second route are diverse.

9. The device of claim 8, where the one or more processors are further to:
delete the first geospatial information and the second geospatial information after providing the diversity information to the customer device.

10. The device of claim 8, where the one or more processors are further to:
receive a plurality of identifiers associated with a plurality of routes provisioned by the first provider device in the first provider network and by the second provider device in the second provider network; and
store in the data structure, the plurality of identifiers and information identifying the first provider device and the second provider device.

11. The device of claim 8, where the one or more processors are further to:
compare the second identifier with the data in the data structure;
identify the second provider device based on comparing the second identifier with the data in the data structure; and
when providing the second identifier to the second provider device, the one or more processors are to:
provide the second identifier to the second provider device based on identifying the second provider device.

12. The device of claim 8, where the one or more processors are further to:
assign weights to the first geospatial information and the second geospatial information; and
calculate a diversity score, for the first route and the second route, based on the assigned weights, the first geospatial information, and the second geospatial information.

13. The device of claim 8, where:
the first geospatial information includes information that identifies geographic locations and characteristics of the first route; and
the second geospatial information includes information that identifies geographic locations and characteristics of the second route.

14. The device of claim 8, where the diversity information includes at least one of:
information indicating that the first route and the second route are diverse,
information indicating that the first route and the second route are not diverse, or
information indicating whether the first route and the second route are diverse within a distance threshold.

15. A non-transitory computer-readable medium for storing instructions, the instructions comprising:
one or more instructions that, when executed by one or more processors of a device, cause the one or more processors to:
receive a plurality of identifiers associated with a plurality of routes provisioned by a first provider device in a first provider network and a second provider device in a second provider network;
store, in a data structure, the plurality of identifiers and information identifying the first provider device and the second provider device;
receive, from a customer device, a request for a diversity determination associated with a first route provided in the first provider network and a second route provided in the second provider network,
the request including a first identifier and a second identifier,
the first identifier including a first secure mechanism to identify the first route, without disclosing information associated with the first route to the customer device, and
the second identifier including a second secure mechanism to identify the second route, without disclosing information associated with the second route to the customer device;

compare the first identifier with data in a data structure;
identify, the first provider device as being associated with the first identifier based on comparing the first identifier with the data in the data structure;
provide the first identifier to the first provider device based on identifying the first provider device;
receive, from the first provider device and based on the first identifier, first geospatial information associated with the first route;
identify, based on the data structure, the second provider device as being associated with the second identifier;
provide the second identifier to the second provider device;
receive, from the second provider device and based on the second identifier, second geospatial information associated with the second route;
determine whether the first route and the second route are diverse based on the first geospatial information and the second geospatial information; and
provide, to the customer device, diversity information regarding whether the first route and the second route are diverse.

16. The non-transitory computer-readable medium of claim 15, where the first provider network is different than the second provider network.

17. The non-transitory computer-readable medium of claim 15, where the instructions further comprise:
one or more instructions that, when executed by the one or more processors, cause the one or more processors to:
compare the second identifier with the data in the data structure;
identify the second provider device based on comparing the second identifier with the data in the data structure; and
provide the second identifier to the second provider device based on identifying the second provider device.

18. The non-transitory computer-readable medium of claim 15, where the one or more instructions that cause the one or more processors to determine whether the first route and the second route are diverse, cause the one or more processors to:
determine that the first route and the second route are diverse when the first route is never within a distance threshold from the second route; and
determine that the first route and the second route are not diverse when the first route is within the distance threshold from the second route at least once.

19. The non-transitory computer-readable medium of claim 15, where the diversity information includes at least one of:
information indicating that the first route and the second route are diverse,
information indicating that the first route and the second route are not diverse, or
information indicating whether the first route and the second route are diverse within a distance threshold.

20. The non-transitory computer-readable medium of claim 15, where the instructions further comprise:
one or more instructions that, when executed by the one or more processors, cause the one or more processors to:
delete the first geospatial information and the second geospatial information after providing the diversity information to the customer device.

* * * * *